June 2, 1959 J. A. DOSMANN 2,888,802
VEHICLE GAS TURBINE POWER SYSTEM
Filed Sept. 7, 1954 2 Sheets-Sheet 1

INVENTOR.
James A. Dosmann

United States Patent Office 2,888,802
Patented June 2, 1959

2,888,802

VEHICLE GAS TURBINE POWER SYSTEM

James A. Dosmann, Mishawaka, Ind.

Application September 7, 1954, Serial No. 454,470

9 Claims. (Cl. 60—39.16)

This invention relates to fluid power systems generally yet particularly to gas turbine power systems wherein a "Turbo" means and a fluid flow reducer means produce a source of gas having large pressure energy for a fluid pressure load. It is recognized that a shaft speed reducer, adapted to a power source with a shaft power output, increases an applied mechanical force (F) for a torque load although acting through a shorter distance (S) by a mechanical advantage.

The "conservation of energy" law requires the $$work_{in} = work_{out}$$

$$F_1 S_1 = F_2 S_2$$

(Assuming no friction loss)

(Variable) F—Mechanical force acting on or obtained by a mechanical means in lbs.
(Variable) S—Distance of mechanical force action in ft.

Similarly, a fluid flow reducer, adapted to a power source with a fluid power output, will increase an applied fluid force (AP) by a mechanical advantage for a fluid pressure load although acting through a shorter distance (S). The fluid velocity is therefore decreased.

$$(A_1 P_1) S_1 = (A_1 P_2) S_2$$

(Constant) A—Area of fluid flow passage in ft.$^2$
(Variable) P—Pressure of fluid in lb./ft.$^2$
(Variable) S—Distance of fluid force action in ft.
(Variable) AP—Fluid force acting on or obtained by a mechanical means in lbs.

Thus, in general, increased fluid pressure is obtained from a fluid flow reducer for a fluid pressure load according to the derived formula.

In present gas turbine power systems the optimum fuel/air ratio depends upon high heat resistant metal to withstand the maximum temperature of the combustion gas. However, a large supply of such metal is not available for mass production of gas turbine engines. Therefore, it is desirable to provide a fluid power system wherein a minimum release of heat energy permits the use of relatively low heat resistant metal to obtain maximum "rate of change of momentum of a gas."

It is therefore one of the principal objects of the present invention to provide a gas turbine power system wherein a minimum release of heat energy to obtain maximum "rate of change of momentum of a gas" permits the use of relatively low heat resistant metal.

Another object of the invention is to provide a fluid flow reducer means for said gas turbine power system wherein a small pressure of a gas produced from a "Turbo" means results in a greater pressure of a gas from a fluid flow reducer means for a fluid pressure load producing a maximum "rate of change of momentum of a gas" using a mechanical advantage $$(A_1 P_1) S_1 = (A_1 P_2) S_2$$

Another object of the invention is to provide a fluid flow energy transformer means for said gas turbine power system wherein an efficient transfer of compressed air flow energy with combustion gas flow energy to form a mixed gas differential flow energy occurs before and within a turbine means.

A further object of the invention is to provide a heat exchange means for said gas turbine power system wherein an efficient transfer of heat energy of exhaust gas to compressed air is obtained.

Yet another object of the invention is to provide a fluid driven mechanical transmission means for said gas turbine power system wherein a fluid momentum input results in a greater shaft power output.

Still another object of the invention is to provide a relatively simple, compact gas turbine power system having low weight for a given performance and requiring minimum maintenance.

In order to obtain the foregoing objects and other objects which will become apparent from the following description, the present invention includes a compression means for primary and secondary compression of air, an air conduit means to permit the flow of air from a compressor to a combustion chamber, a fuel burning means for heating the compressed air, a fluid flow reducer means having, a constant area passage, a turbine means operatively connected with an impeller means impelling combustion products for producing an additional pressure by a mechanical advantage, and a fluid driven mechanical transmission means having a turbine means driven by the combustion products for mechanically driving the mechanical transmission power output means. The invention also contemplates the use of a fluid flow energy transformer means which permits compressed air flow energy by-passing the combustion process to mix with the combustion gas flow energy for greater thermal efficiency, a heat exchange means for preheating diffused air from the heat energy of exhaust gas thus improving thermal efficiency, and a power induction means permitting an initial outside power source for starting.

A gas turbine power system according to the present invention is illustrated in the accompanying drawings, wherein:

Figure 3 is a fragmentary cross-sectional view of the gas turbine power system, taken on line 3—3 of Figure 2; and Figure 4 is a detail view of an induction gear means between a motor-generator and a compression means.

Figure 1:
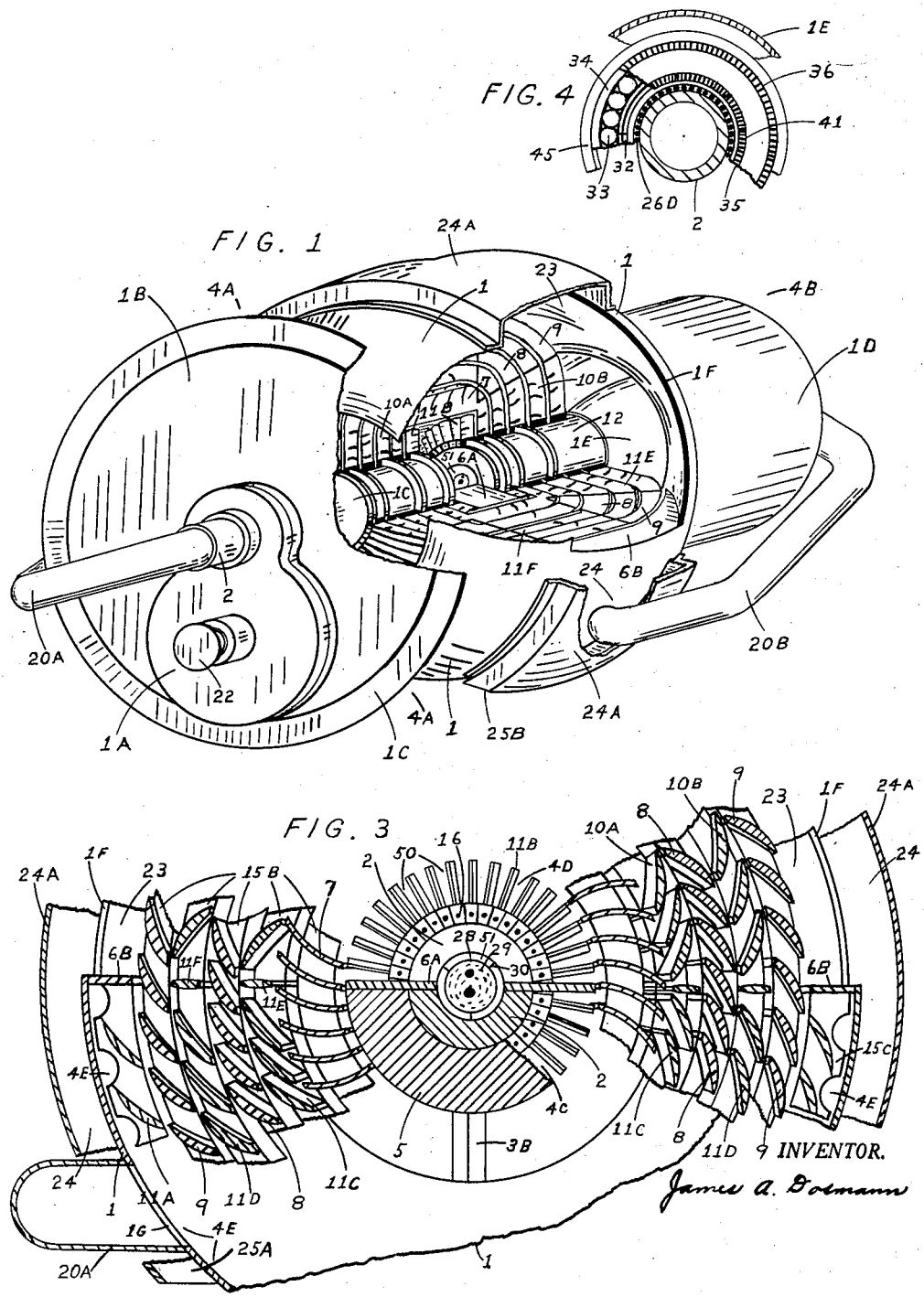
Figure 1 is an external perspective view of a gas turbine power system embodying my invention, in which a section is cut away to show the operative relationship of certain internal parts.
Figure 2:
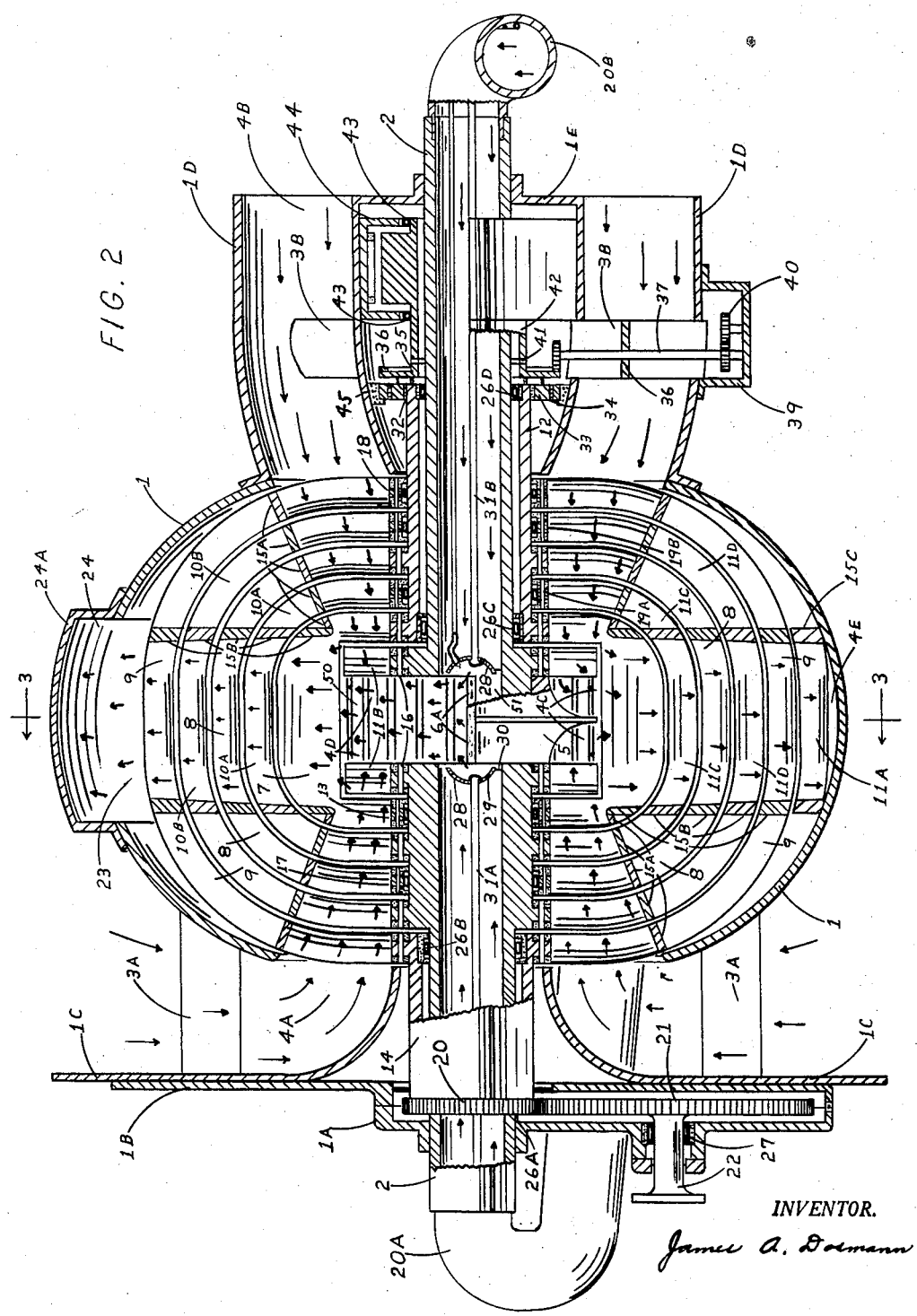
Figure 2 is a vertical cross-sectional view of the gas turbine power system shown in Figure 1.

The gas turbine power system generally stated comprises a compression means, an air conduit means, a combustion means, a fluid flow energy transfer means, a fluid flow reducer means, a fluid driven mechanical transmission means, a heat exchange means, a fluid flow exhaust means, and a power induction means.

The compression means, enclosed within a partially spherical casing with front and rear extension casings 1A, 1B, 1C, 1D, 1E supported by struts 3A, 3B and secured to the stationary shaft 2, consists of a dual axial flow compressor having dual air inlets 4A, 4B, and also a radial flow compressor (Fig. 3) with a semi-annular formed air intake at 4C having a semi-annular convergent flange 5 to direct the air flow outward and inner division walls 6A to separate the air intake 4C from the combustion chamber 51.

The dual axial flow compressor has a dual series of rotating vanes and diffuser vanes arranged symmetrically about the common axis. Each rotating vane is integral with each impeller vane 7 and each turbine blade 8, 9.

Each fixed diffuser vane, except for the innermost diffuser vanes 11B, is integral with each diffuser vane 11C, 11D, 11E, 11F, and nozzle blade 10A, 10B. The rotating vanes and diffuser vanes extend radially outward from the rotor shaft 12, the stationary shaft 2, and rotor shaft 14 to varying periphery where annular formed webs at 15A, between the vanes but integral with each except for the innermost vanes 11B, lend support and serve to encase the inward axial air flow. The dual rotating and diffuser vanes, except for the diffuser vanes 11B, extend radially outward and axially inward from the annular formed webs at 15A to radially formed webs at 15B where the respective vanes form impeller vanes 7, turbine blades 8, 9, and diffuser vanes 11C, 11D, 11E, 11F.

The semi-radial flow compressor operating within a semi-radial space of the partially spherical casing 1 (Fig. 3) has impeller vanes 7 in addition to a series of rotating blades 8, 9 and diffuser vanes 11C, 11D, 11E, 11F arranged with annular formed webs at 15B, between said vanes yet integral with each, to lend support and also serve to encase the consequent semi-radial air flow. The fixed diffuser vanes 11E, 11F (Fig. 3) are arranged to serve as division vanes between the diffuser vanes 11C, 11D and nozzle blades 10A, 10B. The semi-annular formed webs at 15C integral with each of the diffuser vanes 11A are mounted to the inner wall of one half the partially spherical casing 1 to support said vanes for more complete diffusion of the air. The webs at 15C have openings between each diffuser vane 11A for more complete circulation of air at the semi-radial flow compressor outlet chamber 4E. Outer division walls 6B are attached to said casing 1 to divide the semi-radial flow compressor outlet chamber 4E compression chamber from the exhaust chamber 23. The fixed diffusion vanes 11C, 11E, and nozzle blades 10A are mounted with pins 16 at one end to the enlarged circumference of the stationary shaft 2 and at the other (forward) end to one bearing at 19A riding about the impeller turbine rotor shaft 12. The fixed diffuser vanes 11D, 11F, and nozzle blades 10B are mounted with pins 16 at one end to the enlarged circumference of the stationary shaft 2 and at the other (forward) end to one bearing at 19B riding about the impeller turbine rotor shaft 12. The fixed diffuser vanes 11B are secured with pins 16 to the enlarged circumference of the stationary shaft 2.

The air conduit means consists of a hollow stationary shaft 2 and ducts 20A, 20B. Openings 1G are formed in the wall of said spherical casing 1 for delivery of diffused air through ducts 20A, 20B leading axially and radially in direction to the respective ends of the hollow stationary shaft 2 where said air ducts are secured.

The combustion means consists of a combustion chamber 51 formed by a semi-annular section of the hollow stationary shaft 2, the inner division walls 6A attached to said stationary shaft 2, and the fixed diffuser vanes 11B mounted around said stationary shaft 2.

The fluid flow energy transformer means consists of a junction of combustion product and compressed air passages into one mutual passage 50 wherein combustion product flow energy combines with compressed air flow energy forming a mixed gas differential flow energy that is admitted radially outward to the fluid flow reducer means.

The fluid flow reducer means consists of an impeller means, a rotor shaft 12, a turbine means, and a fluid flow casing means. The impeller means consists of radially spaced vanes 7 arranged symmetrically about said stationary shaft 2. The impeller rotating vanes 7 are secured with pins 16 at one end to the rotor shaft 12 and at the other (rear) end to one bearing at 13 rotating about the enlarged circumference of the stationary shaft 2. The turbine means consists of nozzle blades 10A and turbine blades 8. The turbine blades 8 are secured with pins 16 at one end to the rotor shaft 12 and at the other (rear) end to one bearing at 17 rotating about the enlarged circumference of the stationary shaft 2. The fluid flow casing means consists of radially formed webs at 15B arranged between impeller vanes 7, nozzle blades 10A, and turbine blades 8, yet integral with each to lend support and also encase the radial flow of mixed gases.

The fluid driven mechanical transmission means consists of a turbine means and a mechanical transmission means. The turbine means consists of nozzle blades 10B and turbine blades 9. The turbine blades 9 are secured with pins 16 at one end to a rotor shaft 14 and at the other (forward) end to one bearing at 18 rotating about the rotor shaft 12. The mechanical transmission means consists of a rotor shaft 14, reduction gears 20, 21, and a power output rotor shaft 22. The radially formed webs at 15B are arranged between nozzle blades 10B and turbine blades 9, yet integral with each to lend support and encase the flow of mixed gases.

The dual outlet exhaust means consists of an exhaust passage 24 (Fig. 3) formed by a partially annular casing 24A which covers the partially spherical casing outlet 1F and extends on both sides over a section of said casing 1.

The heat exchange means is formed beyond where diffused air ducts 20A, 20B intersect with said annular casing 24A which has circular openings for said air ducts 20A, 20B.

The bearing means for the rotor shaft 12 and rotor shaft 14 supported by the stationary shaft 2 consists of four (4) main bearings at 26A, 26B, 26C, 26D, and arranged to absorb any axial or journal loads. The reduction gear 20 is secured to the rotor shaft 14 at the end thereof. The reduction gear 21 is secured to the power output rotor shaft 22 which is supported by the extension casing 1A with one bearing at 27. Lubricating and cooling the bearings may be accomplished by pressure distribution of oil according to standard commercial application.

Fuel distribution means is arranged with two (2) commerical spray jets each mounted in respective partially spherical baffles 28. Each baffle 28 having vents 29 to permit turbulence of the combustion gases is secured to the inner wall of the stationary shaft 2 with several (3) struts 30. Liquid fuel is supplied by a commercial fuel pump and other fuel accessory equipment (such as throttle valves and filters) through two (2) manifold pipes 31A, 31B to the fuel atomizer jets. The manifold pipes 31A, 31B extend axially from the respective baffles 28 in opposite directions within said shaft 2 and diffused air ducts 20A, 20B then exit from said ducts 20A, 20B to a fuel pump. A standard ignition means is provided to obtain ignition of the fuel with a commercial spark plug mounted to a baffle 28 and with a commercial insulated wire conductor that extends axially within said shaft 2 and diffused air duct 20B then exits from said duct 20B to the required electrical accessory equipment.

The power induction means consists of an induction gear assembly and the motor-generator. The induction gear assembly is arranged symmetrically about the forward end of the impeller turbine rotor shaft 12 having the sun gear 32 secured to said shaft 12 and with planetary gears 33 (Fig. 4) arranged symmetrically about the sun gear 32. The ring gear 34 is secured to the ring gear support housing 45 and arranged symmetrically about the planetary gears 33. The vertical ring gear 36 is secured to a planetary gear stub shaft 35 driving the required auxiliary mechanism through the pinion gear shaft 37 arranged with a support 38 in the hollow strut 3B. The pinion gear housing 39 is mounted to the extension casing 1D to house the pinion gears 40. The planetary gear stub shaft 35 is arranged with a vertical gear coupling 41 to the motor-generator hollow shaft 42. The motor-generator hollow shaft 42 is supported with bearings at 43 by the motor-generator casing 44 which is attached to the extension casing 1E.

In the operation of the gas turbine power system, the dual axial flow compressor serves to draw air from the dual air inlets 4A, 4B, and to discharge the air with primary increased pressure into the dual axial flow compressor outlet chambers 4C, 4D. The radial flow compressor then serves to draw primary compressed air from the dual axial flow compressor outlet chamber 4C, and to discharge that primary compressed air with secondary increased pressure into the radial flow compressor outlet chamber 4E. Openings 1G are formed in the wall of the partially spherical casing for delivery of the compressed air through ducts 20A, 20B leading axially and radially in direction to the respective ends of the hollow stationary shaft 2. The diffused air flow continues inwardly within the hollow stationary shaft 2 from its respective ends to the combustion chamber 51. A fuel distribution means is provided to obtain ignition of fuel for the combustion process. The combustion products are then admitted radially outward. The fluid flow energy transformer means serves to combine primary compressed air flow energy and combustion product flow energy before and within the turbine means forming a mixed gas differential flow energy that is admitted radially outward to a fluid flow reducer means. The fluid flow reducer means, consisting of an impeller and turbine means, imparts additional pressure to the mixed gases by a mechanical advantage. The mixed gases continue radially outward between the impeller blades, nozzle blades 10A arranged in semi-annular form about the impeller blades, and then impinge on turbine blades 8. The turbine blades 8, secured to the rotor shaft 12, mechanically drive said compressors, said impeller, and accessory mechanisms. The fluid driven mechanical transmission means consisting of a turbine means and a mechanical transmission means is provided to obtain the desired shaft power output. The mixed gases continuing radially outward pass between another group of nozzle blades 10B arranged in semi-annular space and impinge on the turbine blades 9. The turbine blades 9 secured to the rotor shaft 14 mechanically drives said compressors and power output rotor shaft 22 via reduction gears 20, 21. The mixed gases then continue radially outward passing into an exhaust chamber 23 hence through a partially spherical casing outlet 1F into an exhaust passage 24. The heat energy from the mixed gases is transferred to the diffused air by conduction as the mixed gases flow between the section of said partially spherical casing 1 and said annular casing 24A around said ducts 20A, 20B, to the exhaust outlets 25A, 25B. A motor-generator, for starting, turns a planetary gear stub shaft 35 through a vertical gear coupling 41 to rotate planetary gears 33 which turn a sun gear 32 and rotor shaft 12 secured thereto initially driving the compression means, the impeller, and accessory mechanism.

During assembly of said engine consideration should be given to the factors of aligning and balancing the rotor assembly to eliminate all unnecessary vibration.

What I claim for Letters Patent is:

1. A gas turbine power system comprising, a dual axial flow compressor having inlets symmetrically disposed about the axis of the compressor on opposite outer sides thereof and outlets that face each other symmetrically disposed about the axis in annular form on the inner sides thereof, a radial flow compressor between the inner sides of the dual axial flow compressor having two semi-annular inlets, symmetrical to the axis of the dual axial flow compressor and connected to the outlets of the latter, and an outlet located radially outward from the axis of the axial flow compressor, a combustion chamber disposed on the inner sides of the dual axial flow compressor, air conduit means connecting the outlet of said radial flow compressor to said combustion chamber, means for introducing fuel into said combustion chamber for continuous combustion therein, a fluid energy transformer means, having inlets connected to the axial flow compressor outlets and the combustion chamber, for combining primary compressed air flow energy with combustion gas flow energy from said dual axial flow compressor and said combustion chamber respectively, a radial flow turbine, disposed on the inner sides of said dual axial flow compressor, having an inlet connected to the fluid flow energy transformer means and an outlet, and mechanically connected to said axial flow compressor and said radial flow compressor, a partially spherical casing including extension casings on opposite sides thereof secured thereby to a supporting hollow stationary shaft for enclosure of the entire device except for part of the air conduit means connecting the radial flow compressor outlet to the combustion chamber, a dual outlet exhaust conduit arranged in almost complete annular disposition about said partially spherical casing on the inner sides of said dual axial flow compressor, a heat exchange means disposed within said dual outlet exhaust conduit where said air conduit means intersect said dual outlet exhaust conduit, a fluid driven mechanical transmission enclosed within one of said extension casings on one outer side of said dual axial flow compressor, a radial flow turbine disposed outwardly adjacent said first mentioned radial flow turbine on the inner sides of said dual axial flow compressor and having an inlet connected to the outlet of said first mentioned radial flow turbine and an outlet connected to said dual outlet exhaust conduit, and mechanically connected to said mechanical transmission, and a power induction means, disposed within the other of said extension casings on the other outer side of said dual axial flow compressor and mechanically connected to said dual axial flow compressor, for starting said power system.

2. A gas turbine power system comprising, a dual axial flow compressor having impeller vanes, fixed diffuser vanes with dual annular sectional web casings, air intakes symmetrically disposed about the axis of the compressor on opposite outer sides thereof, and outlets that face each other symmetrically arranged about the axis in annular form on the inner sides thereof which extend radially outward to radii of the dual annular web casings, a radial flow compressor between the inner sides of the dual axial flow compressor having impeller vanes, fixed diffuser vanes with radially section web casings, two semi-annular inlets symmetrical to the axis of the dual axial flow compressor and connected to the outlets of the later, and an outlet located radially outward from the axis of the dual axial flow compressor, air conduits connecting said radial flow compressor outlet with a hollow stationary shaft coaxial with and extending through the dual axial flow compressor thus forming continuous conduit means for delivery of diffused air, a combustion chamber disposed about the axis of said hollow stationary shaft on the inner sides of said dual axial flow compressor connecting with said air ducts and having a semi-annular sectional casing, means for supplying fuel to said combustion chamber for continuous combustion therein, means for transforming fluid flow energy of combustion products and compressed air to a differential mixed gas flow energy from said combustion chamber and said dual axial flow compressor respectively, a radial flow turbine, disposed on the inner sides of said dual axial flow compressor, having an inlet connected to the fluid flow energy transformer means and adapted to mechanically drive said radial flow compressor and said dual axial flow compressor, a partially spherical casing with extension casings on opposite sides thereof secured thereby to said hollow stationary shaft for enclosure of the entire device except for part of the air ducts, a dual outlet exhaust conduit having an exhaust casing arranged in almost complete annular disposition on the inner sides of said dual axial flow compressor and secured to the periphery of said partially spherical casing, heat exchange means comprising the extension of said air conduits through said exhaust casing for exchange of heat energy, a gas driven mechanical transmission enclosed within one of said extension casings on one outer side of said dual axial flow compressor, a radial flow turbine disposed outwardly adjacent said first mentioned radial flow turbine and having an inlet connected to the outlet of said first mentioned radial flow turbine and an outlet connected to said dual outlet exhaust conduit, and mechanically adapted to drive said mechanical transmission, said radial flow compressor, and said dual axial flow compressor, a power induction means enclosed within the other of said extension casings on the other outer side of said dual axial flow compressor and arranged symmetrically about said hollow stationary shaft for starting said power system, and an ignition means arranged in said combustion chamber permitting ignition of fuel therein.

3. A gas turbine power system comprising, a dual axial flow compressor having inlets symmetrically disposed about the axis of the compressor on opposite outer sides thereof and outlets that face each other symmetrically disposed about the axis in annular form on inner sides thereof, a combustion chamber disposed on the inner sides of said dual axial flow compressor, air conduit means connecting the outlet of said dual axial flow compressor to said combustion chamber, means for introducing fuel into said combustion chamber for continuous combustion therein, a radial flow turbine, disposed on the inner sides of said dual axial flow compressor, having an inlet connected to the combustion chamber and an outlet, and mechanically connected to the dual axial flow compressor, a partially spherical casing including extension casings on opposite sides thereof secured thereby to a supporting hollow stationary shaft for enclosure of the device, a dual outlet exhaust conduit arranged in annular disposition about said spherical casing on the inner sides of said dual axial flow compressor, a gas driven mechanical transmission enclosed within one of said extension casings on one outer side of said dual axial flow compressor, a radial flow turbine disposed outwardly adjacent said first mentioned radial flow turbine on the inner sides of said dual axial flow compressor and having an inlet connected to the outlet of said first mentioned radial flow turbine and an outlet connected to said dual outlet exhaust conduit, and mechanically connected to said axial flow compressor and said mechanical transmission, and a power induction means disposed within the other of said extension casings on the other outer side of said dual axial flow compressor and mechanically coupled to the dual axial flow compressor for starting said power system.

4. A gas turbine engine adapted for shaft power comprising, a partially spherical casing arranged in annular disposition about the axis of the casing with extension casings on opposite sides thereof, a hollow stationary shaft disposed about the axis of the spherical casing and extending through the casing and extension casings for supporting the extension casings, a dual axial flow compressor comprising two sections disposed within the partially spherical casing and spaced from each other along the axis of the casing, each section having impeller means for rotation thereof about said hollow stationary shaft and fixed diffuser means axially adjacent to said impeller means about said hollow stationary shaft, outlets for the dual axial flow compressor, a radial flow compressor disposed within the partially spherical casing on the inner sides of said dual axial flow compressor having impeller means for rotation thereof about said hollow stationary shaft and semi-annular spaced fixed diffusion means disposed radially adjacent said impeller means, inlets for the radial flow compressor connected to the outlets of the dual axial flow compressor, a combustion chamber means centrally disposed on the inner sides of said dual axial flow compressor about the axis of said hollow stationary shaft, air conduit means connecting and leading radially and axially in opposite directions from said radial flow compressor to said combustion means, means for introducing fuel into said combustion means for continuous combustion therein, a fluid flow energy transformer means, having inlets connected to the axial flow compressor outlets and the combustion chamber, for combining combustion product flow energy with compressed air flow energy to obtain a mixed gas differential flow energy, a radial flow turbine, having an inlet connected to the fluid flow energy transformer means and an outlet, and connected by a rotor shaft to the radial flow compressor for rotation thereof about said hollow stationary shaft, a gas driven mechanical transmission enclosed within one of said extension casings on one outer side of said dual axial flow compressor and mechanically connected to a power output shaft for useful shaft power, a radial flow turbine disposed outwardly adjacent said first mentioned radial flow turbine on the inner sides of said dual axial flow compressor having an inlet connected to the first radial flow turbine outlet and an outlet, and mechanically connected to said radial flow compressor, said dual axial flow compressor, and said mechanical transmission, and a dual outlet exhaust conduit connected to the outlet of said second radial flow turbine and arranged in almost complete annular disposition about said partially spherical casing on the inner sides of said dual axial flow compressor for exhausting gas to the atmosphere.

5. An engine as defined in claim 4, said dual axial flow compressor having dual air intakes and outlets.

6. An engine according to claim 4, said impeller means, said turbine means, and said diffuser means having sectional web casings to lend support and encase the flow of gas.

7. An engine as defined in claim 4, said radial flow compressor having two semi-annular inlets and an outlet on inner sides of said dual axial flow compressor.

8. An engine according to claim 3, said power induction means having a motor-generator with a hollow rotor shaft and a planetary gear assembly with a stub rotor shaft mechanically coupled to said dual axial flow compressor for starting said engine.

9. An engine according to claim 4, in which the air conduit means pass through the dual outlet exhaust in heat exchange relation for transferring heat energy from the exhaust gases to compressed air in the air conduit means.

References Cited in the file of this patent

UNITED STATES PATENTS

| | | |
|---|---|---|
| 1,224,673 | Scott | May 1, 1917 |
| 1,276,260 | Parrish | Aug. 20, 1918 |
| 1,723,515 | Kock | Aug. 6, 1929 |
| 1,726,104 | Harris | Aug. 27, 1929 |
| 2,632,297 | Ogston | Mar. 24, 1953 |
| 2,669,092 | Hammaren | Feb. 16, 1954 |
| 2,748,564 | Marchal et al. | June 5, 1956 |

FOREIGN PATENTS

| | | |
|---|---|---|
| 669,412 | Germany | Dec. 24, 1938 |